Patented Mar. 30, 1948

2,438,560

UNITED STATES PATENT OFFICE 2,438,560

MANUFACTURE OF CATALYSTS

Elmer R. Kanhofer, Riverside, Ill., assignor to Universal Oil Products Company, Chicago, Ill., a corporation of Delaware No Drawing. Application July 30, 1945, Serial No. 607,904

10 Claims. (Cl. 252—250)

This application is a continuation-in-part of my co-pending application Serial No. 485,151 (abandoned) filed April 30, 1943, which in turn is a continuation-in-part of application Serial No. 330,952 (abandoned) filed April 22, 1940.

This invention relates to a novel and improved method for the manufacture of silica and to the preparation of catalysts especially suitable for accelerating reactions among hydrocarbons. More specifically it has reference to a method of manufacturing finely divided catalytic materials which are particularly effective in selectively promoting the formation of high antiknock motor fuel from higher boiling hydrocarbons or petroleum fractions having low antiknock value. The preferred catalysts are particularly characterized by their fine texture. They consist of definite components and are prepared synthetically by definite procedures which are specific in the production of catalysts of high activity and stability under relatively severe conditions of service during processing and reactivation periods.

Manufacturing processes are generally known wherein hydrous oxide gels are composited in the preparation of catalysts useful in various hydrocarbon conversion processes. Hydrated silica is one of the hydrous oxides which has been composited with various hydrous oxide gels such as alumina, for example, in the preparation of catalysts. The conventional gels are prepared and composited by a number of different methods in which especial care is employed as to the manner in which the reagents are mixed, the concentrations used, etc., so that the hydrated silica gel and/or the other hydrous gels composited either form a gel, or a sol which sets on standing to form the gel. In contradistinction thereto, it has been found that a particularly desirable type of highly active and stable catalysts can be produced according to the present invention by the formation of very finely divided precipitates thereby incidentally avoiding, among other things, the major difficulties which usually attend washing and filtration of undried gels.

In a broad aspect, the present invention relates to a process for producing finely divided non-gelatinous silica which comprises commingling mineral acid with a solution containing not more than 30% by weight of an alkali metal silicate, about 7 to about 15% by weight of an alkali metal halide, and about 51 to about 91% by weight of water.

In another aspect, the present invention comprises the manufacture of catalytic materials suitable for use in hydrocarbon conversion reactions by forming a finely divided silica in the manner hereinbefore set forth and compositing the silica with hydrated alumina, hydrated zirconia, or hydrated alumina and hydrated zirconia.

In a specific embodiment the present invention comprises a process for the preparation of finely divided silica-alumina type composites by first precipitating finely divided hydrated silica by commingling a mineral acid with a solution containing not more than 30% by weight of an alkali metal silicate, about 7 to about 15% by weight of an alkali metal halide, and about 51 to about 91% by weight of water, washing said hydrated silica to the substantially complete removal of alkali metal compounds, and compositing the washed silica with hydrated alumina.

In a further embodiment the alumina may be added to the silica by suspending the latter in a solution of an aluminum salt and precipitating hydrated aluminum oxide by the addition of a volatile basic precipitant such as ammonium hydroxide.

According to the present invention, finely divided hydrous oxides of silicon are composited with other hydrous oxides to give highly active and stable catalysts particularly useful in hydrocarbon conversion reactions, said hydrous oxides of silicon being precipitated as very finely divided particles which tend to remain in suspension for prolonged periods of time as contrasted with gelatinous precipitates or sols which set into gels upon prolonged standing.

The precipitation of the hydrated silica is brought about under definitely controlled conditions in the presence of an added substance, such as a salt and particularly a halide of an alkali metal. The finely divided precipitate may vary as to its degree of dispersion depending upon the specific details of procedure employed, but precipitates highly suitable for use as powdered catalysts have been prepared where the particles are so small and of such a nature that they exhibit little or no tendency to settle out of suspension for prolonged periods of time. It has been found in some cases that the formation of finely divided material depends not only on the nature and amount of the alkali metal compound added and the point at which it is added in the process but also upon the dilution of the reactants and the manner in which the reactants are mixed as will be hereinafter illustrated.

The compounds which are used in accordance with the present invention to insure the precipitation of hydrated silica in a fine state of subdivision are the halides of the alkali metals and particularly the chlorides thereof. The most generally utilizable compound is ordinary sodium chloride since this is cheap and readily available and gives good results. The amount of added alkali metal halide which needs to be present either in the alkali metal silicate solution or in the acid with which the alkali metal solution is composited to cause the precipitation of silica in finely divided condition will vary with the salt itself, with the dilution of the solutions and with the method of compositing.

Various methods may be employed in preparing finely divided hydrated silica and compositing with other hydrous oxides in accordance with the present invention depending upon the particular use to which the composite is to be put. A finely divided hydrated silicate may be prepared by adding an acid to an alkali metal silicate such as a commercial grade of water glass diluted with approximately 3 to 10 times its volume of water and containing an added amount of sodium chloride insuring the formation of finely divided hydrated silica. A minimum amount of sodium chloride is used for a particular dilution of water glass and acid is gradually added while thoroughly agitating, in an amount sufficient to precipitate a finely divided hydrated silica. The rate of addition of the acid should not be rapid, however, as too rapid acidification may tend to form gelatinous silica even when an alkali metal halide is present. It is necessary even where the proper amount of the added substance is present to thoroughly mix the reacting solutions and employ mixing times of 5 to 20 minutes or more depending upon the size of batch and other factors.

An extensive series of experiments show definitely that there were definite proportions of the three components of the mixture which must be employed if the desired finely divided hydrated silica was to be produced. The ranges in which these components may be present to form finely divided silica and not a gelatinous mass are (1) the alkali metal silicate should not be present in excess of 30% by weight of the solution, (2) the alkali metal halide should be present in a range of about 7 to about 15% by weight of said solution, and (3) water in excess of that present in the alkali metal silicate should be between about 51 to about 91% by weight of the solution. Under these conditions, commingling the solution with a mineral acid will result in the production of finely divided non-gelatinous silica, whereas if too small an amount of added alkali metal halide is present the silica is produced in a gelatinous form. Similarly, if too great an amount of alkali metal halide is present the process is inoperative because the solubility of the sodium chloride is exceeded and silica precipitates when the salt is added before the acidification of the solution. When the water glass is present in an amount greater than 30% by weight of the solution, the silica precipitated in a finely divided non-gelatinous condition but the suspension was too viscous and it was difficult to recover and wash the precipitated silica.

When acidifying a water glass containing sodium chloride, an intermediate precipitate is observed before sufficient acid has been added to precipitate all of the silica. These intermediate precipitates have been found to be insoluble and highly siliceous complexes containing varying amounts of alkali metal compounds. As the remaining portions of the acid are added, the composition of these precipitates changes so that the finely divided silica finally present after acidification to a pH value of about 2 is essentially hydrated silica holding a small amount of alkali metal compounds by occlusion.

As an example of one method of compositing hydrous oxides, a finely divided hydrated silica may be admixed while still in suspension with a separately precipitated hydrated oxide. In another method the suspension of hydrated silica may be mixed with a solution of a salt of the metal whose hydrated oxide is to be precipitated in the presence of the finely divided hydrated silica and an alkaline precipitant may then be added to precipitate the hydrous oxide. In the case of a composite prepared in this manner, the hydrous oxide is precipitated in the presence of not only the added salt, but also the salt formed by the neutralization of the alkali metal silicate with the acid added to precipitate the hydrated silica. These salts or salt solutions in this and subsequent procedures may be reused in subsequent preparation. Variations of this procedure may be employed whereby the primary hydrated silica is filtered and separated from the salt solution, washed and purified if desired and re-slurried or otherwise used for compositing with the remaining hydrous oxide component. According to this last-named method, a finely divided hydrated silica may be precipitated, filtered and washed to remove alkali metal impurities by certain alternative methods which will be subsequently described, the purified hydrated silica then dispersed in a solution containing aluminum chloride, for example, and hydrated alumina precipitated in the presence of the finely divided hydrated silica by the addition of ammonium hydroxide.

The finely divided hydrated silica is preferably filtered and washed to remove substantially all alkali metal compounds and then intimately composited with the other hydrous oxides such as those of alumina and/or zirconia, which may have been separately precipitated. Alternatively the hydrated silica is mixed with a solution of the salts of the metal of the hydrated oxide to be precipitated in and on its surfaces, and a basic reagent is then added to precipitate a hydrous oxide such as alumina and/or zirconia. The basic reagent employed may be an alkali metal hydroxide, ammonium hydroxide or alkaline precipitants generally, and the amount added may be such that the pH is not far removed from the neutral point.

The hydrous oxides composited with the finely divided, hydrated silica may be those of aluminum, zirconium, vanadium, thorium, chromium, molybdenum and numerous other metals yielding composites with hydrated silica having catalytic properties. Various proportions of silica and such oxides may be composited, the more frequent practice being to employ minor amounts of added hydrous oxides and major proportions of hydrated silica. Thus in the preparation of highly effective silica-alumina catalysts, approximately 5 to 30 percent of hydrated alumina is preferably composited with the silicon. Smaller and higher proportions of alumina may also be utilized. Similarly, hydrated zirconia or other hydrous oxides may be employed or mixtures of these hydrous oxides, good results having been obtained in cracking reactions using catalysts comprising silica, alumina and zirconia, composited according to this invention. Highly active catalysts have been produced by compositing several mols of alumina and 5 to 10 mols of zirconia with 100 mols of the specially prepared silica.

Suspensions of the precipitated silica or its composites with other hydrated oxides may be washed in any convenient form of filtration apparatus such as a filter press or centrifugal filter wherein the great bulk of the liquid is removed and a filter cake formed which may be washed with comparative ease as contrasted with gelatinous precipitates or gels. It has been found desirable when producing catalyst composites in a highly active and stable form to carefully wash the precipitates and/or composites free from salts and particularly alkali metal impurities. This may be accomplished by using various reagents such as, for example, washing with various acid and salt solutions. Water acidulated with strong acids may be used or solutions of salts of ammonium, or metals corresponding to those of the added metal oxides for example. The composite materials may be purified before or after drying. These purification processes may be employed on the silica prior to its compositing with the remaining hydrous oxides. The composited materials may be finally dried at temperatures of approximately 200–250° F., more or less.

The catalysts produced by the present procedure are very finely divided as compared with products from similar materials prepared from gels by former methods as illustrated by the fact that aqueous suspensions of the material in preparation are very slow in settling out. Some preparations having particular sizes of the order of 5 to 20 microns, and if formed and shaped contact masses are prepared from them, the formed particles are approximately one-half as dense as corresponding particles produced from gels. If desired the finely divided materials may be formed into shaped particles by the conventional consolidating and shaping processes such as pilling and briquetting, or they may be extruded. Various lubricants may be employed to facilitate pelleting such as graphite, hydrogenated vegetable oil, certain metal palmitates and stearates, etc., and organic materials such as flour, starch, etc.

The finely divided catalyst composites are highly suitable for suspending in a stream of oil which is processed under suitable conditions of temperature, pressure and contact time to carry out hydrocarbon conversion reactions to produce large yields of high antiknock gasoline. The kind of powdered catalyst used is not restricted to any single preparative procedure since various types of oil cracking may be carried out in the presence of the powdered catalyst. In the cracking of a heavy oil where in some cases it may not be desired to recover the catalyst, it may not be necessary to purify or even dry the powdered product. On the other hand, in many operations, it will be desirable to use a highly stable form of the catalyst which is separated from residual and carbonaceous deposits and repeatedly regenerated. Large yields of gasolines having high octane numbers have been obtained per pass as illustrated in the specific examples given hereinafter. The powdered catalyst may be separated from the oil by various procedures and the separated catalyst regenerated by removing the hydrocarbonaceous deposits by processes such as by solvent treatment or heating in the presence of air whereupon it is used again either alone or in admixture with fresh catalyst in suspension in the hydrocarbon oil processed.

The usefulness of this material, however, is not restricted to its use in powdered form since it may be formed into particles and disposed in beds in catalyst reactors through which preheated vapors are passed at reaction temperatures. In this type of operation, the catalyst is intermittently regenerated by heated oxidizing gas mixtures whereby carbonaceous deposits are removed.

The following specific examples are given to illustrate applications of the process of the invention, the activity of the catalyst preparation also being indicated. However, the invention should not be considered as limited to these examples of the process or to the particular catalyst preparations since these are merely given as illustrations.

*Example I*

A silica-alumina catalyst was prepared by diluting a commercial sample of water glass approximately 5 times with water and mixing therewith approximately one-half of the weight of water glass of sodium chloride dissolved in about the same amount of water used to dilute the water glass. Diluted hydrochloric acid was added to the water glass-sodium chloride solution while agitating thoroughly and a suspension of very finely divided hydrated silica formed while the solution was still alkaline. An excess of acid was then added and this was subsequently partly neutralized by the addition of ammonium hydroxide. A solution of aluminum chloride in water was then added to the hydrated silica suspension and after thorough mixing, ammonium hydroxide was added to precipitate hydrated alumina in the presence of the suspended silica, the ammonium hydroxide being added until the liquid was substantially neutral. The composite precipitate was then filtered, the filter cake dried to substantial dryness, and the dried material washed with acidulated water until the washings were substantially free from sodium ions.

The catalyst produced in this manner, when admixed with a Pennsylvania distillate oil and heated to a temperature of approximately 750–800° F. under a pressure of 100 pounds per square inch gave a yield of approximately 62% of 350° F. end point gasoline having approximately 78 octane number.

*Example II*

A sample of powdered catalyst was prepared as follows: 90 pounds of sodium chloride were dissolved in 140 gallons of water and 160 pounds of commercial water glass containing 8.9% $Na_2O$ and 28.1% $SiO_2$ was added to the salt solution which was then further diluted to approximately 165 gallons. Concentrated hydrochloric acid was gradually added to the diluted sodium silicate-sodium chloride solution while agitating. The addition of acid was continued until the liquid still remained slightly alkaline at which point a very finely divided silica suspension was formed. An excess of acid was then added and the excess acid substantially neutralized with ammonium hydroxide. The silica suspension was then pumped into another tank containing approximately 20 gallons of a solution containing 20 pounds of aluminum chloride. Ammonium hydroxide solution was then added to precipitate hydrated alumina in the presence of the finely divided hydrated silica in suspension, ammonium hydroxide being added until the solution was substantially neutral. The composite precipitate was then filtered on a centrifugal filter and washed by means of acidulated water to remove alkali metal impurities. The washed cake was dried at approximately 250° F. The dried material was a fluffy powder of very fine texture.

Catalyst prepared in this manner, admixed to the extent of approximately ½ of 1% by weight with a Pennsylvania gas oil of approximately 36° A. P. I. gravity and heated to a reaction temperature of approximately 800° F. at a pressure of approximately 50 pounds per square inch, yielded in a single pass 28 volume percent of 400° F. end point gasoline having an octane number of 78. The catalyst is readily separated from the oil and is capable of further use on regeneration either alone or in admixture with fresh catalyst.

*Example III*

A powdered catalyst having the approximate composition 100 $SiO_2$:$Al_2O_3$:$5ZrO_2$ may be prepared as follows: 180 pounds of commercial water glass containing 8.9% $Na_2O$ and 28.1% $SiO_2$ is added to 140 gallons of water containing approximately 90 pounds of sodium chloride in solution. Concentrated hydrochloric acid diluted with an equal volume of water is gradually added to the diluted sodium silicate-sodium chloride solution while agitating. The addition of acid is continued until the liquid still remains slightly alkaline at which point a very finely divided silica suspension is formed. An excess of acid is then added and the excess acid substantially neutralized with ammonium hydroxide. The silica suspension is then filtered, the filtrate being saved for re-use in subsequent batches, and is then carefully washed with water containing a small amount of aluminum chloride in solution until the washings are substantially free from alkali metal ions. The purified silica is suspended in water and pumped into a tank containing approximately 20 gallons of aluminum chloride and zirconyl chloride solution. Ammonium hydroxide solution is added to precipitate hydrated alumina and hydrated zirconia in the presence of the silica suspension whereupon the composited precipitate is filtered and the filter cake dried to substantial dryness at approximately 250° F. Catalysts prepared in this manner will give substantially the same results as indicated above in cracking operations and are readily regenerated for repeated use in further cracking runs.

I claim as my invention:

1. A process for producing finely divided non-gelatinous silica which comprises commingling a mineral acid with a solution containing not more than 30% by weight of an alkali metal silicate, about 7 to about 15% by weight of an alkali metal halide, and about 51 to about 91% by weight of water.

2. A process for producing finely divided non-gelatinous silica which comprises commingling a mineral acid with a solution containing not more than 30% by weight of an alkali metal silicate, about 7 to about 15% by weight of an alkali metal chloride, and about 51 to about 91% by weight of water.

3. A process for producing finely divided non-gelatinous silica which comprises commingling a mineral acid with a solution containing not more than 30% by weight of sodium silicate, about 7 to about 15% by weight of sodium chloride, and about 51 to about 91% by weight of water.

4. A process for producing a finely divided catalyst which comprises commingling a mineral acid with a solution containing not more than 30% by weight of an alkali metal silicate, about 7 to about 15% by weight of an alkali metal halide and about 51 to about 91% by weight of water, compositing the silica thus formed with a metal oxide to form an active composite having catalytic properties.

5. A process for the manufacture of a catalyst which comprises slowly adding with thorough agitation a mineral acid to a solution containing not more than 30% by weight of an alkali metal silicate, about 7 to about 15% by weight of an alkali metal halide and about 51 to about 91% by weight of water to precipitate from said solution finely divided non-gelatinous particles of hydrated silica, compositing the hydrated silica thus formed with a salt of a metal capable of being converted to the oxide thereof and form a composite having catalytic properties.

6. The process as defined in claim 5 further characterized in that said salt comprises an aluminum salt.

7. The process as defined in claim 5 further characterized in that said salt comprises a zirconium salt.

8. The process as defined in claim 5 further characterized in that said salt is an aluminum salt and further in that a salt of zirconium is also added to said silica and aluminum salt.

9. A process for producing a catalyst comprising silica and alumina which comprises commingling a mineral acid with a solution containing not more than 30% by weight of an alkali metal silicate, about 7 to about 15% by weight of an alkali metal chloride and about 51 to about 91% by weight of water to precipitate finely divided hydrated silica, treating said silica to remove alkali metal ions therefrom, forming a composite of treated silica and hydrated alumina, and heating the said last-named composite to remove a substantial portion of water therefrom.

10. A process for producing a catalyst comprising silica and zirconia which comprises commingling a mineral acid with a solution containing not more than 30% by weight of an alkali metal silicate, about 7 to about 15% by weight of an alkali metal chloride and about 51 to about 91% by weight of water to precipitate finely divided hydrated silica, treating said silica to remove alkali metal ions therefrom, forming a composite of treated silica and hydrated zirconia, and heating the said last-named composite to remove a substantial portion of water therefrom.

ELMER R. KANHOFER.

REFERENCES CITED

The following references are of record in the file of this patent:

UNITED STATES PATENTS

| Number | Name | Date |
|---|---|---|
| 1,012,911 | Poulson | Dec. 26, 1911 |
| 1,642,880 | Kriegsheim et al. | Sept. 29, 1927 |
| 2,229,353 | Thomas et al. | Jan. 21, 1941 |
| 2,280,650 | Kassel | Apr. 21, 1942 |

FOREIGN PATENTS

| Number | Country | Date |
|---|---|---|
| 5,783 | Great Britain | June 8, 1914 |